United States Patent
Yates et al.

(10) Patent No.: US 6,225,976 B1
(45) Date of Patent: May 1, 2001

(54) REMOTE COMPUTER INPUT PERIPHERAL

(75) Inventors: William Allen Yates, Camarillo; Michael R. Smither, Castaic; Jack A. Segal, Oxnard; Steven B. Branton, Ventura; James D. Tickle, Thousand Oaks; John K. Martinelli, Camarillo, all of CA (US)

(73) Assignee: Interlink Electronics, Inc., Camarillo, CA (US)

( * ) Notice: Subject to any disclaimer, the term of this patent is extended or adjusted under 35 U.S.C. 154(b) by 0 days.

(21) Appl. No.: 09/183,889

(22) Filed: Oct. 30, 1998

(51) Int. Cl.$^7$ ........................................... G09G 5/00
(52) U.S. Cl. .................. 345/156; 345/173; 345/179; 341/21; 341/22; 341/23
(58) Field of Search ...................... 345/173, 179, 345/156, 146; 341/23, 21, 22; 455/11.1

(56) References Cited

U.S. PATENT DOCUMENTS

| | | |
|---|---|---|
| 5,059,958 | 10/1991 | Jacobs et al. . |
| 5,200,913 * | 4/1993 | Hawkins et al. ........................ 341/23 |
| 5,307,297 | 4/1994 | Iguchi et al. . |
| 5,379,057 | 1/1995 | Clough et al. . |
| 5,410,333 | 4/1995 | Conway . |
| 5,450,079 * | 9/1995 | Dunaway ................................ 341/23 |
| 5,528,266 | 6/1996 | Arbeitman et al. . |
| 5,543,818 | 8/1996 | Scott . |
| 5,551,693 | 9/1996 | Goto et al. . |
| 5,587,560 | 12/1996 | Crooks et al. . |
| 5,681,220 | 10/1997 | Bertram et al. . |
| 5,708,458 | 1/1998 | Vrbanac . |
| 5,716,274 | 2/1998 | Goto et al. . |
| 5,748,185 * | 5/1998 | Stephan et al. ........................ 345/173 |
| 5,956,019 * | 10/1999 | Bang et al. ............................ 345/373 |
| 5,983,073 * | 11/1999 | Ditzik ................................... 455/11.1 |
| 5,996,956 * | 12/1999 | Shawver ................................ 345/179 |

* cited by examiner

*Primary Examiner*—Richard Hjerpe
*Assistant Examiner*—Ali Zamani
(74) *Attorney, Agent, or Firm*—Brooks & Kushman P.C.

(57) ABSTRACT

A hand-held remote computer input peripheral is operable to be held by a human operator with one hand while both hands harmoniously manipulate a touch pad, function keys, and a click button provided with the input peripheral. The touch pad is positioned in a housing to be held by one hand while comfortably being addressed by the other hand, either with a finger or stylus, for controlling typical computer mouse functions and/or entering graphic images. The fingers of the hand holding the input peripheral rest naturally on the function keys and the click button such that keys and button can be activated simultaneously, or in conjunction with, activities of the hand manipulating the touch pad. The input peripheral is advantageously used in electronic meeting room applications having a computer and communication peripherals such as electronic white boards, presentation projectors, and video conferencing systems.

11 Claims, 5 Drawing Sheets

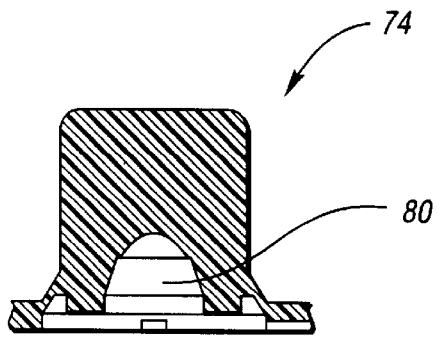
*Fig. 14*
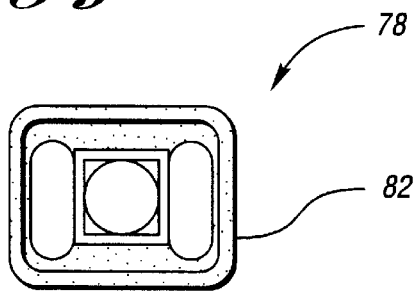
*Fig. 15*
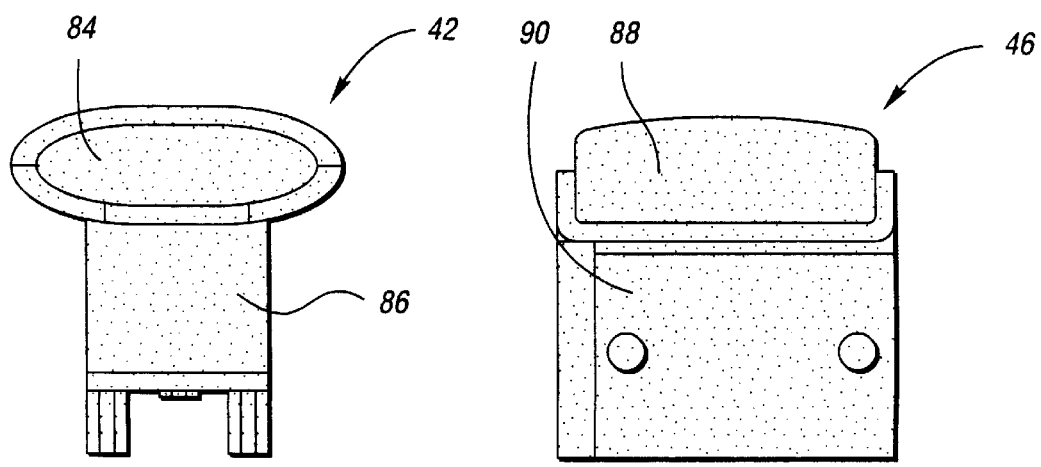
*Fig. 16*          *Fig. 17*

REMOTE COMPUTER INPUT PERIPHERAL

TECHNICAL FIELD

The present invention relates to remote computer input peripherals and, more particularly, to a remote computer input peripheral used to control presentation projectors, electronic white board hardware and software, and personal computer (PC) based video and teleconferencing.

BACKGROUND ART

The proliferation of computer driven systems and appliances into arenas that were traditionally non-computer related has rendered conventional user input devices inadequate, and sometimes obsolete. Considerable resources are being spent to create new user-interface paradigms using pen and voice.

An electronic meeting room typically includes a PC and a number of communications peripherals. The communications peripherals include white boards, presentation projectors, and video and teleconferencing systems. People use the communications peripherals for white board applications involving interactive presentations and meetings, and collaborative data sharing sessions.

An electronic meeting room does not need to be a single room. Rather, an electronic meeting room can be a virtual room where one or more persons in different physical locations are connected together via the Internet or some other communications network.

A user interface controls remote location meetings and conferences where computerized data and document sharing takes place through a teleconferencing or a video conferencing medium. Currently, the user interface for the above applications involves employing multiple devices such as a projector remote control, a microphone, a mouse, a wireless keyboard, a digitizer pad, and a phone. A problem with employing multiple devices for the user interface is that users must manipulate many devices making the user interface less friendly.

Pad-entry paradigms employing touch pads have been developed which incorporate the features of some of the multiple devices. It is desirable that one hand holds the touch pad in space while the other hand manipulates the touch pad with either a finger(s) or a stylus. A problem with these prior art pad-entry paradigms is that the hand manipulating the pad needs to be constantly lifted from the pad surface to perform clicks or other entry functions (usually the activation of hard or soft keys). This interruption of mousing or graphic capturing tasks causes inconvenience and renders the device less friendly and usable.

Other pad-entry paradigms require the pad to be set down, thereby freeing up the holding hand to perform other functions. Some current paradigms use expensive pad technology solutions to facilitate usage such as a specialized stylus or pen that requires either activation of buttons on the pen or pressing the stylus tip against the pad. Other paradigms require a pad designed to sense proximity of a special stylus to accomplish certain functions. These prior art paradigms require specialized technologies that are expensive and less practical to do in a portable, wireless device.

SUMMARY OF THE INVENTION

Accordingly, it is an object of the present invention to provide a remote computer input peripheral that combines several input requirements, currently managed via multiple devices, into one intuitive hand-held input device.

It is another object of the present invention to provide a hand-held remote computer input peripheral having a touch pad that enables the harmonious working of the hand holding the peripheral with the hand manipulating the touch pad.

It is a further object of the present invention to provide a hand-held pad sensor peripheral held by one hand while being addressed by the other hand either with a finger(s) or stylus in which the fingers and/or thumb of the holding hand activate input buttons on the peripheral simultaneously, or in conjunction with, input activities of the pad addressing hand.

In carrying out the above objects and other objects, the present invention provides a hand-held remote computer input peripheral for communicating with a host computer having a graphical user interface with a cursor and other objects. The input peripheral includes a housing having a top surface, first and second opposed side surfaces, and a rear surface. A human operator holds the housing in space by using a first hand to grip the first side portion. A touch pad is positioned in the top surface of the housing such that the operator manipulates the touch pad using a second hand. A plurality of activation mode buttons are positioned in the top surface of the housing. Each of the activation mode buttons corresponds to a respective activation mode of the touch pad. The operator switches between activation modes by pressing the activation mode buttons with the second hand. A plurality of function keys are positioned in the top surface of the housing. Each of the function keys corresponds to a respective user-defined function. The operator actuates functions by pressing the function keys using the first hand while manipulating the touch pad with the second hand. A click button is positioned on the housing to be actuated by the first hand of the operator. The operator actuates the click button with the first hand while manipulating the touch pad with the second hand.

An advantage of the present invention is that the harmonious working of both hands of the operator renders the input peripheral user preferred.

These and other features, aspects, and embodiments of the present invention will become better understood with regard to the following description, appended claims, and accompanying drawings.

BRIEF DESCRIPTION OF THE DRAWINGS

FIGS. 11–15 are detailed drawings of the user-definable function keys of the input peripheral shown in FIG. 1;

FIG. 16 is a side click button of the input peripheral shown in FIG. 1;

FIG. 17 is a forward click button of the input peripheral shown in FIG. 1;

BEST MODES FOR CARRYING OUT THE INVENTION

Figure 1:
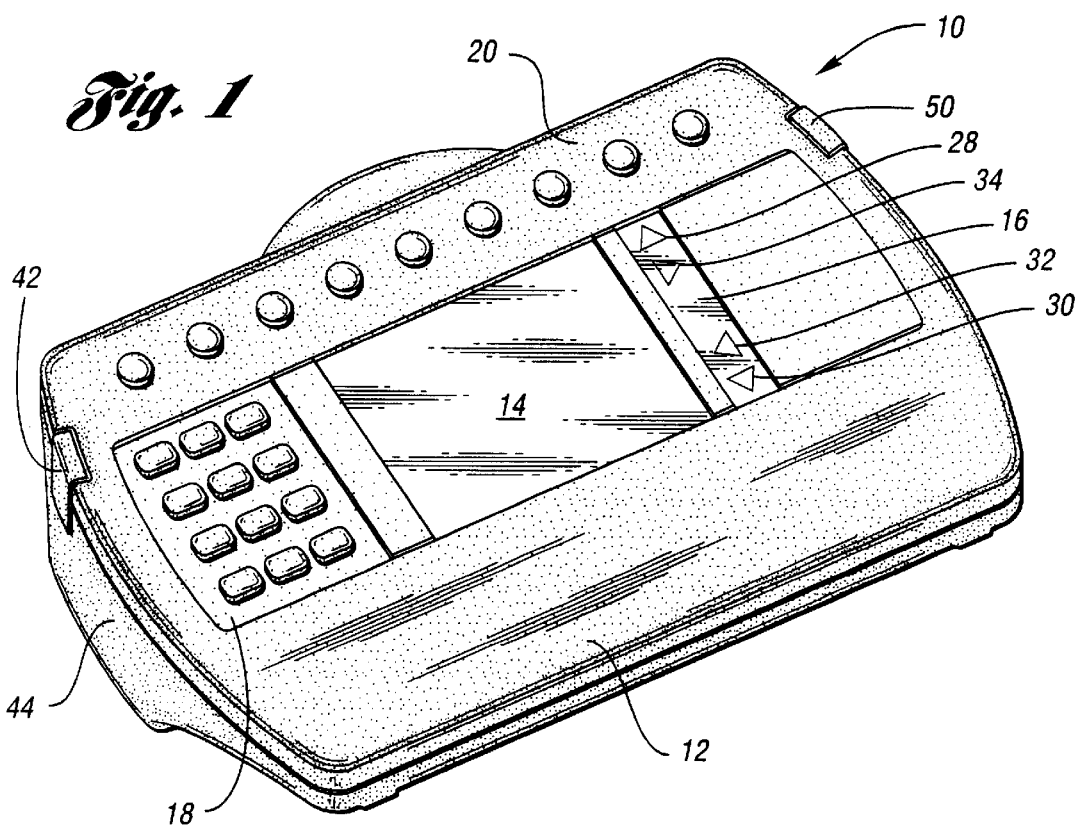
FIG. 1 is a perspective view of a remote computer input peripheral in accordance with a preferred embodiment of the present invention.
Figure 2:
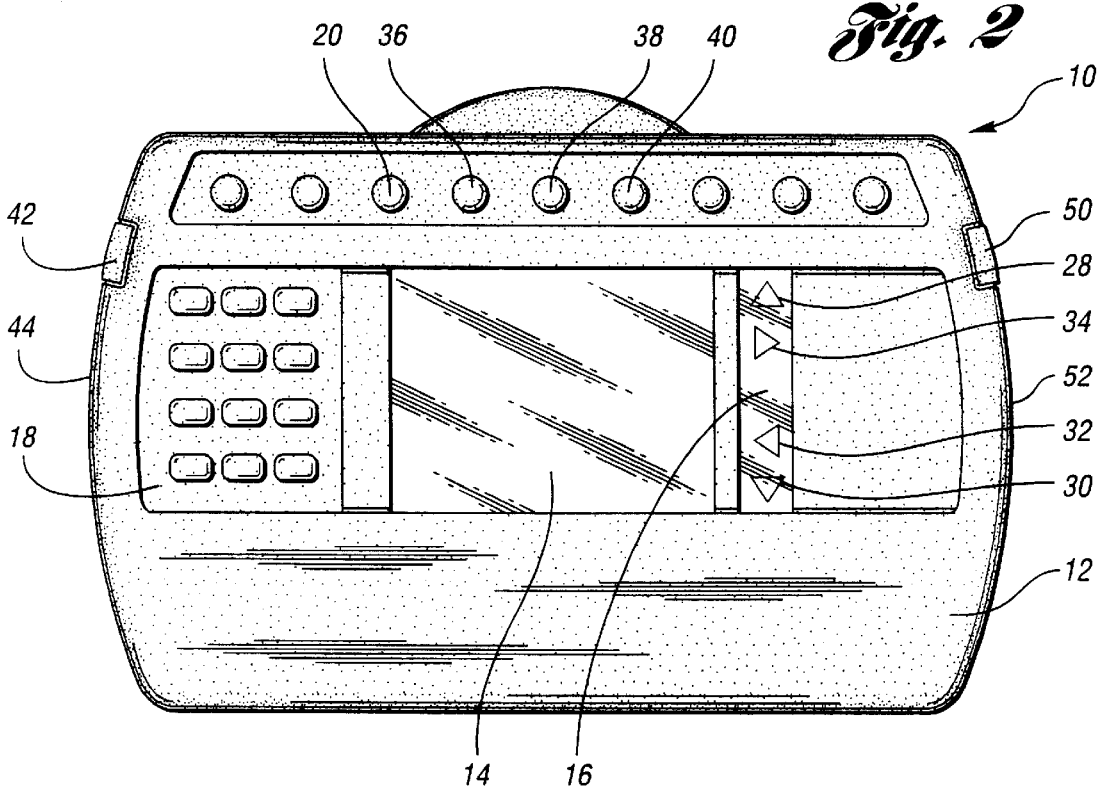
FIG. 2 is a top plan view of the input peripheral shown in FIG. 1.
Figure 3:
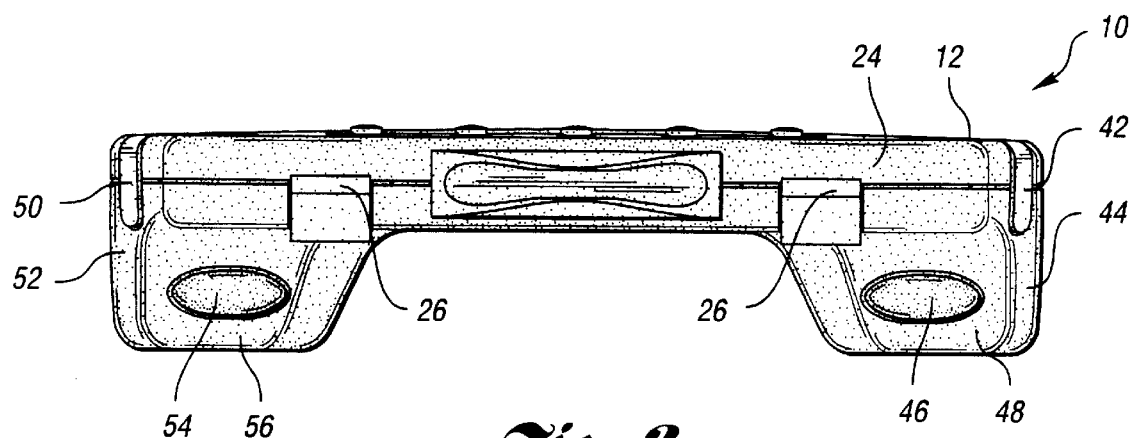
FIG. 3 is a rear plan view of the input peripheral shown in FIG. 1.
Figure 4:
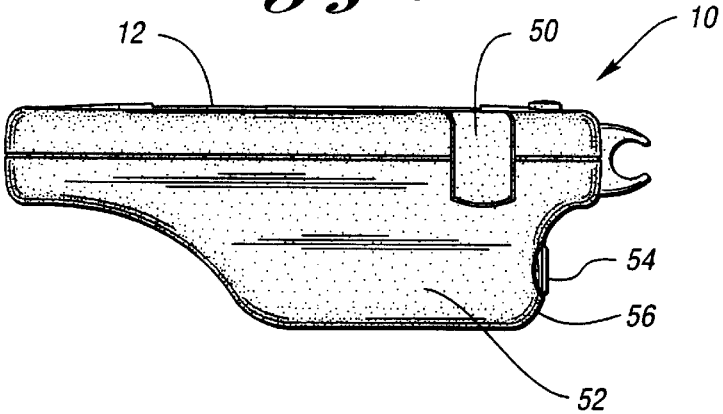
FIG. 4 is a side plan view of the input peripheral shown in FIG. 1.
Figure 5:
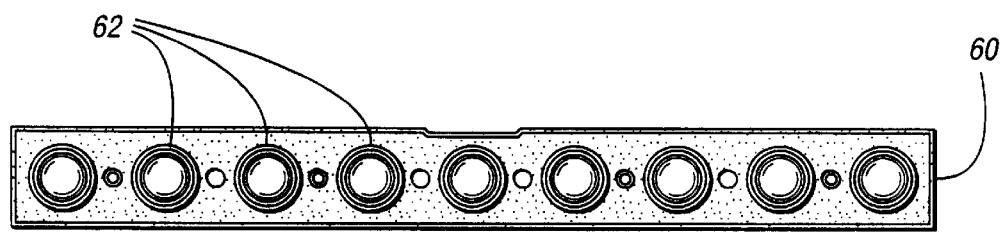
FIGS. 5–10 are detailed drawings of the activation mode buttons of the input peripheral shown in FIG. 1.
Figure 6:
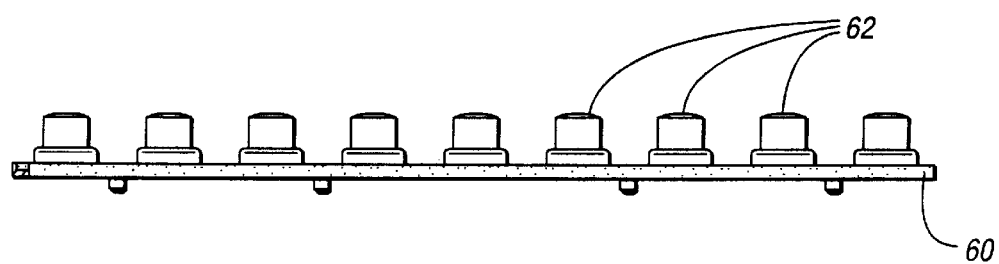
Figure 7:
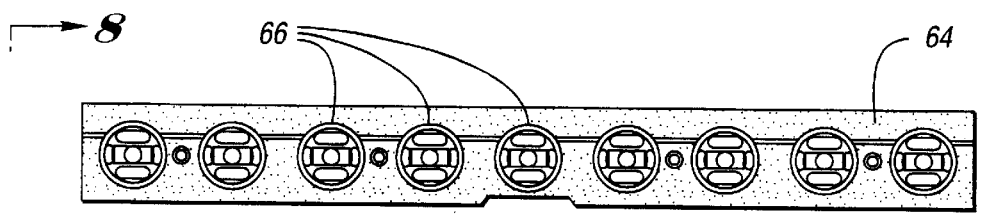
Figure 8:
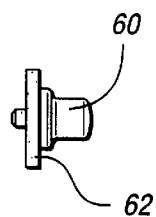
Figure 9:
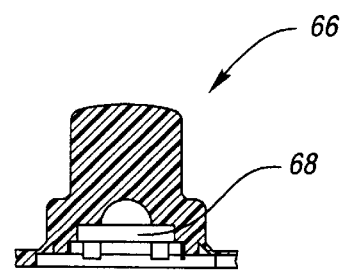
Figure 13:
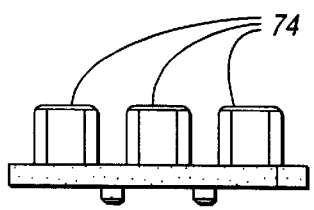
Figure 10:
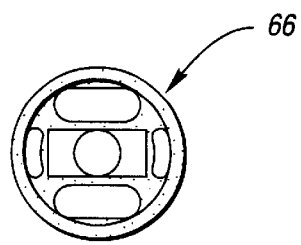
Figure 11:
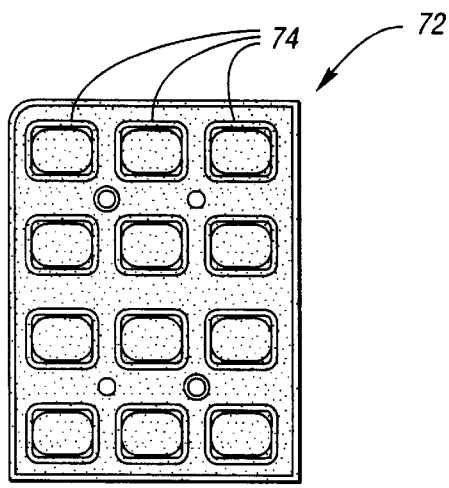
Figure 12:
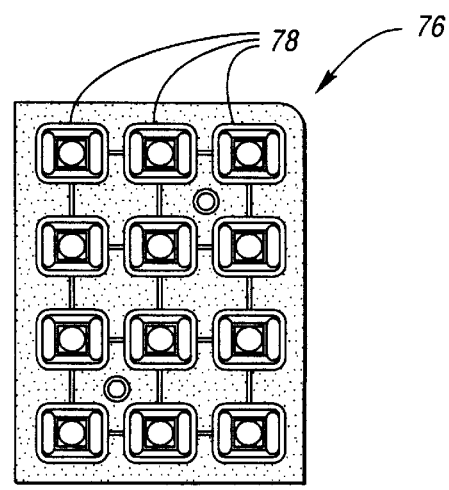

Referring now to FIGS. 1–4, a remote computer input peripheral 10 in accordance with a preferred embodiment of the present invention is shown. Input peripheral 10 includes a top surface 12 having a touch pad 14, a pan and scroll bar region 16, a set of user-definable function keys 18, and a row of activation mode buttons 20. Touch pad 14 provides information indicative of the position of an operator's finger or stylus touching the touch pad to a computer (not shown) through a communications link located on a rear surface 24 of input peripheral 10. The communications link communicates with the computer using a hard wire connection (not shown) or optically with a pair of light emitting devices (LEDs) 26. The computer processes the information to control fluctuations of a graphical user interface producing a display having a cursor. An operator may also select commands or manipulate graphically portrayed objects in the graphical user interface.

Touch pad 14 reports the entry of pressure, relative motion, absolute position, tap, double-tap, and tap-and-drag inputs to the touch pad. Pan and scroll bar region 16 allows the operator to use four scrolling functions (up, down, left, and right) by pressing on four separate areas of the region which are marked by respective arrows 28, 30, 32, and 34. User-definable function keys 18 invoke commands assigned to the keys in a driver.

Activation mode buttons 20 switch the operation of touch pad 14 (through the computer host software) between different modes. Preferably, touch pad 14 has three modes of operation: annotation, typing, and pointing. Accordingly, activation mode buttons 20 include an annotation (draw) mode button 36, a type mode button 38, and an absolute pointing mode button 40. The operator selects the mode of touch pad 14 by pushing or tapping one of activation mode buttons 20.

The annotation mode allows the operator to annotate whatever is currently being showed on the graphical user interface (screen) of the host computer. In essence, the annotation mode is the electronic equivalent of allowing the operator to take a marker and write on the glass face of the screen. Preferably, input peripheral 10 includes the capability to allow the annotations to be saved with the object that has been annotated. Annotations can either be saved as an OLE object in the annotated document or as an OLE object in an annotation file. Annotations can be made in different colors using "nibs" of different sizes, shapes, and angles. Annotations can be erased using different sized erasers. The current pen color, nib size and shape, and eraser size are stored by the host computer. A pen tool is provided that allows an ink color to be selected from a plate of colors and different nibs and erasers from trays of each.

When touch pad 14 is in the annotation mode the cursor displayed on the screen changes from the standard windows arrow to a precession select cursor. To leave ink, the operator must click and hold a left side click button 42 located on a left side surface 44 of input peripheral 10. When left side click button 42 is held the cursor changes to a handwriting cursor in the color of the currently selected ink. Moving the cursor by manipulating touch pad 14 leaves ink such that the top of the nib is at the upper left tip of the handwriting cursor. To erase, the operator must click and hold a left forward click button 46 located on left rear surface 48 of input peripheral 10. When left forward click button 46 is held the cursor changes to an erase cursor. Moving the cursor erases the annotation such that the area erased is a circle centered on the current position of the cursor. The size of the circle is based on the current eraser size selected. Input peripheral 10 includes a right side click button 50 located on a right side surface 52 and a right forward click button 54 located on a right rear surface 56. Buttons 50 and 54 perform the same functions as buttons 42 and 46 and may be used advantageously by a left handed person if function keys 18 are placed on the right side of touch pad 14.

A pen tool control window is used to change nib size, shape, angle, ink color, and eraser size. The pen tool control window is assigned to one of function keys 18. Accordingly, the pen tool control window can be invoked by the hand holding input peripheral 10 while the other hand is manipulating touch pad 14.

When the pen tool control window is displayed on the screen, the cursor is put in relative mode and is restricted to moving within the pen tool control window. Closing the pen tool control window reverts the cursor to the mode it was in when the pen tool control window was invoked. The pen tool control window contains separate controls for changing nib size, shape, angle, ink color, and eraser size.

In the pointing mode, touch pad 14 operates as a typical computer mouse. Pointing is a relative task. Touch pad 14 supports a single tap as a click of left side click button 42, a double tap as a double click of the left side click button, and a tap and drag as holding the left side click button while the mouse is in motion. Touch pad 14 also works in conjunction with left forward click button 46.

In the typing mode, the operator can input ASCII characters to the host computer by handwriting them on touch pad 14. Input peripheral 10 includes pen to text software as known in the art to support the typing mode.

Pan and scroll bar operation is mode independent. The operator can press on one of arrows 28, 30, 32, or 34 to cause the screen of the host computer to pan or scroll in the direction of the arrow. When used in this manner, the harder the operator presses the arrow, the faster the screen pans or scrolls.

User-definable function keys 18 perform operations based on the function (i.e., macros, tools, menu choices, etc.) assigned to the function keys by the operator. When the operator presses or taps a function key with the holding hand the assigned operation is performed. Some function keys such as "volume up" will repeatedly perform the assigned operation while the function key is held down. Other function keys perform their respective operation only once each time the function key is pressed.

Specific functions can be assigned to the function keys using the graphical user interface. The interface contains a tool kit of presentation, navigation, and pen input tools. Among these tools are blank with reveal, zoom, send keystroke(s), program launch, presentation launch, spotlight, pointer/stamp shapes, capture image, clear screen, scribble, write, speed dial, phone/address book, show pen tool control window, pre-set a control, i.e., change ink color, nib size, nib angle, nib shape, or eraser size to a specific setting, jump to a control, volume up/down, mute, etc.

Referring now to FIGS. 5–10, detailed drawings of activation mode buttons 20 are shown. Activation mode buttons 20 include a top strip 60 having a plurality of buttons 62 and a bottom strip 64 having a plurality of corresponding electrically conductive pads 66. As shown best in FIGS. 9–10, button 62 includes an actuating portion 68 which engages a corresponding conductive actuating portion 70 of pad 66 when the button is pressed or tapped causing the mode linked to that button to be activated.

Referring now to FIGS. 11–15, detailed drawings of user-definable function keys 18 are shown. Function keys 18 include a top portion 72 having a plurality of buttons 74 and a bottom portion 76 having a plurality of corresponding electrically conductive pads 78. As shown best in FIGS. 14–15, button 74 includes an actuating portion 80 which engages a corresponding conductive actuating portion 82 of pad 78 when the button is pressed or tapped by a finger of the hand holding input peripheral 10 causing the function linked to that key to be activated.

Referring now to FIG. 16, a side click button 42 (or 50) is shown. Side click button 42 includes a human digit engaging surface 84 and an actuating portion 86. By clicking engaging surface 84, actuating portion 86 engages a corresponding conductive actuation portion (not shown) of input peripheral 10 to activate side click button 42.

Referring now to FIG. 17, a forward click button (or paddle) 46 (or 54) is shown. Forward click button 46 includes a human digit engaging surface 88 and an actuating portion 90. By clicking engaging surface 88, actuating portion 90 engages a corresponding conductive actuation portion (not shown) of input peripheral 10 to activate forward click button 46.

Figure 18:
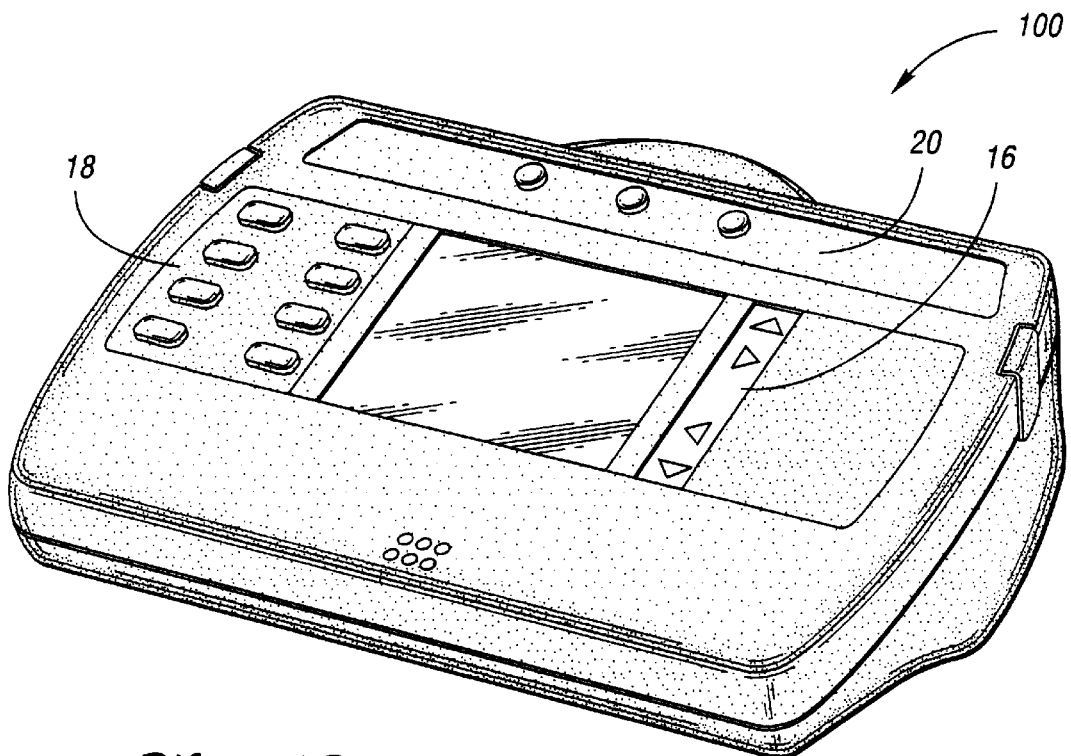
FIG. 18 is a perspective view of a remote computer input peripheral in accordance with a second embodiment of the present invention.
Figure 19:
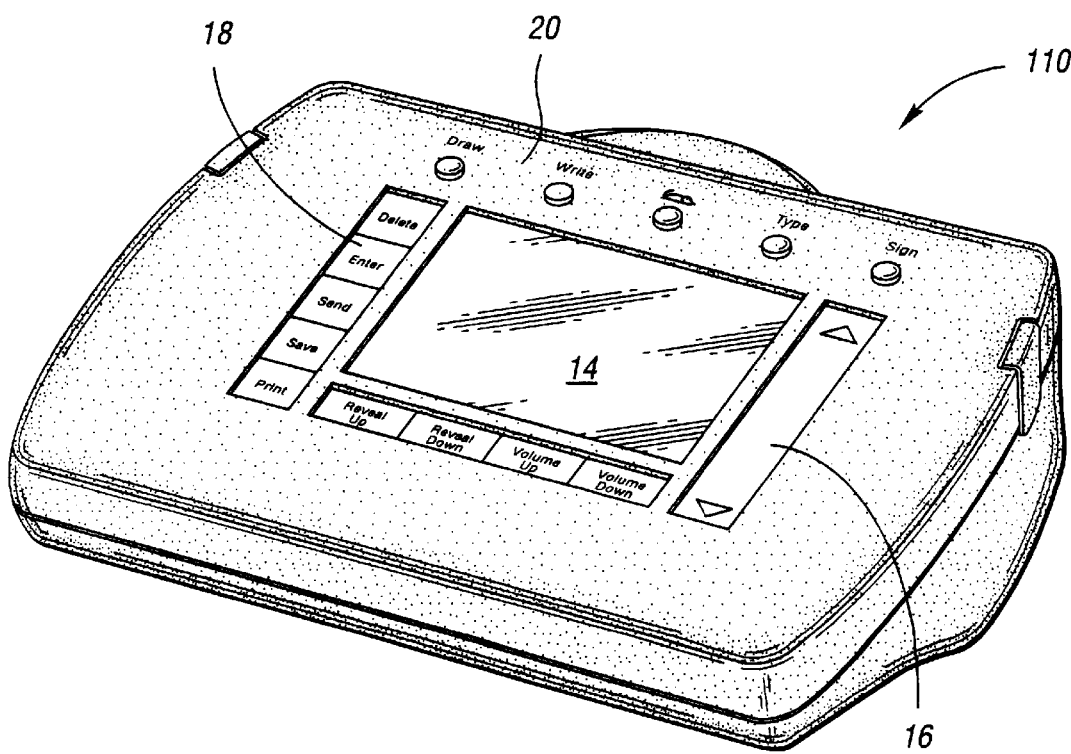
FIG. 19 is a perspective view of a remote computer input peripheral in accordance with a third embodiment of the present invention.

Referring now to FIGS. 18–19, a remote computer input peripheral 100 and 110 in accordance with a second and third embodiment, respectively, of the present invention is shown. Input peripheral 100 differs from input peripheral 10 in the number of user-definable function keys 18 and activation mode buttons 20. Input peripheral 110 differs from input peripheral 10 in that user-definable function keys are arranged around the perimeter of touch pad 14, the number of activation mode buttons 20, and pan and scroll region 16 provides only scrolling (up and down) arrows.

Thus it is apparent that there has been provided, in accordance with the present invention, a remote computer input peripheral that fully satisfies the objects, aims, and advantages set forth above.

While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A hand-held remote computer input peripheral for communicating with a host computer, the input peripheral comprising:

a housing having a top surface, first and second opposed side surfaces, and a rear surface, wherein a human operator holds the housing in space by using a first hand to grip the first side portion;

a touch pad positioned in the top surface of the housing, wherein the human operator manipulates the touch pad using a second hand;

a plurality of activation mode buttons positioned in the top surface of the housing, each of the activation mode buttons corresponding to a respective activation mode of the touch pad, wherein the human operator switches between activation modes by pressing the activation mode buttons with the second hand;

a plurality of function keys positioned in the top surface of the housing, each of the function keys corresponding to a respective user-defined function, wherein the function keys and the touch pad are operably positioned in the top surface of the housing with respect to one another such that the function keys are actuable by the first hand of the human operator while the human operator holds the housing in space with the first hand and manipulates the touch pad with the second hand; and a click button positioned on the housing to be actuated by the first hand of the human operator, wherein the click button and the touch pad are operably positioned with respect to one another such that the click button is actuable by the first hand of the human operator while the human operator holds the housing in space with the first hand and manipulates the touch pad with the second hand.

2. The input peripheral of claim 1 wherein:

the click button is positioned on the first side portion to be actuated by the human operator using the thumb of the first hand.

3. The input peripheral of claim 1 wherein:

the click button is positioned on the rear surface adjacent to the first side portion to be actuated by the human operator using a forefinger of the first hand.

4. The input peripheral of claim 1 further comprising:

a pan and scroll region adjacent to the touch pad, wherein the human operator manipulates the pan and scroll region using the second hand.

5. The input peripheral of claim 1 wherein:

the human operator manipulates the touch pad using a finger of the second hand.

6. The input peripheral of claim 1 wherein:

the human operator manipulates the touch pad using a stylus held by the second hand.

7. The input peripheral of claim 1 further comprising:

a light emitting device located on the rear surface of the housing for communicating with the host computer.

8. The input peripheral of claim 1 wherein:

the activation modes includes annotation, typing, and pointing modes.

9. The input peripheral of claim 1 wherein:

the annotation mode allows the human operator to annotate objects displayed on a graphical user interface of the host computer.

10. The input peripheral of claim 1 wherein:

the pointing mode allows the human operator to manipulate the touch pad and the click button such that the input peripheral functions as a computer mouse.

11. The input peripheral of claim 1 wherein:

the typing mode allows the human operator to input ASCII characters to the host computer by handwriting them on the touch pad with the second hand.

* * * * *